United States Patent [19]
Angelopoulos et al.

[11] Patent Number: 6,057,902
[45] Date of Patent: May 2, 2000

[54] PIXELS FOR WIDE VIEWING ANGLE LIQUID CRYSTAL DISPLAY

[75] Inventors: Marie Angelopoulos, Cortlandt Manor; David Andrew Lewis, Carmel; Shui-Chih Alan Lien, Briarcliff Manor, all of N.Y.

[73] Assignee: International Business Machines Corporation, Armonk, N.Y.

[21] Appl. No.: 09/129,736

[22] Filed: Aug. 5, 1998

[51] Int. Cl.[7] .................................................. G02F 1/1337
[52] U.S. Cl. .......................................... 349/129; 349/124
[58] Field of Search .................................. 349/129, 126, 349/125, 124

[56] References Cited

U.S. PATENT DOCUMENTS

| | | | |
|---|---|---|---|
| 5,249,070 | 9/1993 | Takano | 359/54 |
| 5,280,375 | 1/1994 | Tsuda et al. | 349/129 |
| 5,309,264 | 5/1994 | Lien et al. | 359/87 |
| 5,619,357 | 4/1997 | Angelopoulos et al. | 349/110 |
| 5,623,354 | 4/1997 | Lien et al. | 349/124 |
| 5,654,780 | 8/1997 | Hasegawa et al. | 349/124 |
| 5,745,206 | 4/1998 | Koike et al. | 349/117 |
| 5,781,262 | 7/1998 | Suzuki et al. | 349/129 |

*Primary Examiner*—James A. Dudek
*Attorney, Agent, or Firm*—Pollock, Vande Sande & Amernick; Daniel P. Morris

[57] ABSTRACT

A structure for providing a wide viewing angle for a liquid crystal display or similar comprising the formation of more than one region within a pixel (for each color) which provides more than one pretilt angle is provided by controlling chemistry of a second layer placed in predetermined locations within a single pixel.

32 Claims, 3 Drawing Sheets

PIXELS FOR WIDE VIEWING ANGLE LIQUID CRYSTAL DISPLAY

TECHNICAL FIELD

The present invention relates to pixels for a liquid crystal display (LCD) panel and, more particularly, for a display panel having wide viewing angle. The present invention is concerned with pixels having at least two regions within each pixel of different pretilt angle.

BACKGROUND OF INVENTION

It is known that liquid crystal displays with a single domain in each cell or pixel have unsymmetrical viewing angles behavior, especially in the vertical viewing-axis for single-domain LCD's orientated in the conventional manner.

In the current fabrication of single-domain liquid crystal displays, each surface of the panel's transparent electrodes in contact with the liquid crystal (LC) layer is formed with an alignment film. These two films or layers usually are rubbed so as to form the alignment direction as illustrated by the direction of the molecules 28 in FIG. 2. The alignment layers cause the alignment of the longitudinal axes of the liquid crystal molecules and a tilting of the molecules at a small angle, known at the pre-tilt angle, relative to the place of the alignment layer. The pre-tilt angle of the LC molecules adjacent to the alignment films are such that the bulk liquid crystal molecules are caused to take a common orientation with the molecules adjacent the alignment layers so that each pixel or cell will exhibit a single domain when voltage is applied.

Depending on the rubbing directions of the alignment films in the fabrication of the panel and with the display in the conventional orientation as shown in FIG. 1, either the top or bottom viewing zone will have a large reverse contrast whereas the opposite vertical zone (bottom or top) will have poor contrast between gray scale levels.

It has been found that, with the display in the conventional orientation, the vertical viewing angle behavior of the liquid crystal display is improved when the display cells or pixels are each fabricated such that two domains are formed when voltage is applied across the liquid crystal layer. Five methods have been proposed for fabricating such two domain pixels, namely, 1) multiple rubbing as disclosed in JP 63-106624; 2) multiple alignment layer as reported in SID 92 Digest, p. 798; 3) edge field fringe as described in U.S. Pat. No. 5,249,070; 4) parallel fringe as described in U.S. Pat. No. 5,309,264, and assigned to the same assignee as the present application; and 5) UV method as disclosed in U.S. Pat. No. 5,623,354, and assigned to the same assignee as the present application, disclosures of which are incorporated herein by reference.

In method 1), alignment layers in a pixel are each divided by a boundary and the area on one side of the boundary is rubbed in one direction and the area on the other side is rubbed in the opposite direction to form an alignment layer with two areas each with a different alignment direction. When one area is being rubbed, the other area must be protected thereby complicating the fabrication process. Method 2) also is complicated since it requires additional lithographic and etching steps, as well as, deposition of both inorganic and organic alignment layers. An inorganic alignment material is first deposited on each of the transparent electrodes followed by the deposition of an organic alignment on the inorganic layer. A photoresist is coated on the organic layer and patterned and developed so that half of each of the inorganic/organic layers of each pixel are still covered by the photoresist after development. The organic alignment layer in the half where the photoresist has been removed is etched away to leave that half of the pixel with the inorganic alignment layer and the other half with the organic layer after the photoresist is removed. Finally, each of the inorganic/organic layers are rubbed in the appropriate direction to complete the fabrication of the alignment layers, each with two areas. In method 3), only a single domain is present when voltage is not applied, but the fringe fields at opposite edges of the pixel cause the liquid crystal molecules to tilt toward the field at their closest edge when voltage is applied to produce two domains in the pixel. In method 4) a slot is formed or etched in the common electrode in the center of each pixel so that, when voltage is applied, two pairs of parallel fringe fields are produced, one field of a pair by the pixel edge and the other field of this pair by the edge of the slot. These two parallel fringe fields with voltage applied will cause LC molecules on each side of the slot in the pixel to tilt in the direction of the edge fringe field on the respective side of the slot, thereby forming two domains. In method 5), selected areas of alignment layer are exposed to the UV light to change the pre-tilt angle at those areas.

Three of these methods increase the complexity of fabricating a two-domain display panel as compared to a panel with only a single domain per cell. The multiple rubbing method 1) requires protecting part of the alignment layer with photoresist and multiple rubbing of the alignment layer. Similarly, the multiple alignment layer of method 2) and the parallel fringe field of method 4) demand patterning with photoresist and removal of part of the organic layer in method 2) or part of the electrode layer in method 4). Since these three methods necessitate coating, baking, patterning, developing and stripping a photoresist, the fabrication of the display panel by any one of these methods is more complicated and thus increases the manufacturing cost above the cost of a single-domain display panel. Method 3) does not form two areas in each pixel to form a two-domain pixel but, by utilizing the edge fringe fields, creates a two-domain pixel when voltage is applied. However, with this method, the boundary between the two domains is not well defined. Method 5) is simple and effective but it usually requires large UV dosage to create the appropriate pre-tilt angle difference. Due to the high dosage, chain scissioning occurs in the alignment layers, which most commonly are polyimides. Chain scissioning in turn results in free-radical formation and possible charged species. As a result, "image sticking" is observed in the LCD panel fabricated with this method. Image sticking is currently one of the most serious problems which hinders the fabrication of multidomain LCDs with wide viewing angle.

SUMMARY OF INVENTION

The present invention makes it possible to noticeably enhance all of the viewing angle behavior of a liquid crystal display. According to the present invention, the viewing angle behavior of the liquid crystal display can be successfully improved so that quality viewing is possible.

More particularly, the present invention relates to a liquid crystal display panel comprising a plurality of pixels wherein each pixel has an alignment layer having at least two regions provided with an organic polymer alignment layer with pretilt angles differing from each other by at least 1.5° when aligned in the same direction for enhancing the viewing angle of the liquid crystal display. It being understood, of course, that the term "aligned" as used herein refers to the process of rubbing or otherwise aligning rather than to imply that the physical disposition of the liquid crystal to each of the first and second alignment layers is the same.

In addition, the present invention is concerned with a method for fabricating a pixel for a liquid crystal display. The method comprises providing a first alignment layer of a first organic polymeric material and providing a second alignment layer of a second organic polymeric material different from said first organic polymeric material on selected regions less than the entire pixel. The first and second alignment layers have pretilt angles differing from each other by at least 1.5° when aligned in the same direction.

The first and second alignment layers are aligned in the same direction thereby forming an alignment with at least two areas with pretilt angles differing from each other by at least about 1.5° for enhancing the viewing angle of the liquid crystal display.

Still other objects and advantages of the present invention will become readily apparent by those skilled in the art from the following detailed description, wherein it is shown and described only the preferred embodiments of the invention, simply by way of illustration of the best mode contemplated of carrying out the invention. As will be realized the invention is capable of other and different embodiments, and its several details are capable of modifications in various obvious respects, without departing from the invention. Accordingly, the description is to be regarded as illustrative in nature and not as restrictive.

BEST AND VARIOUS MODES FOR CARRYING OUT INVENTION

Figure 1:
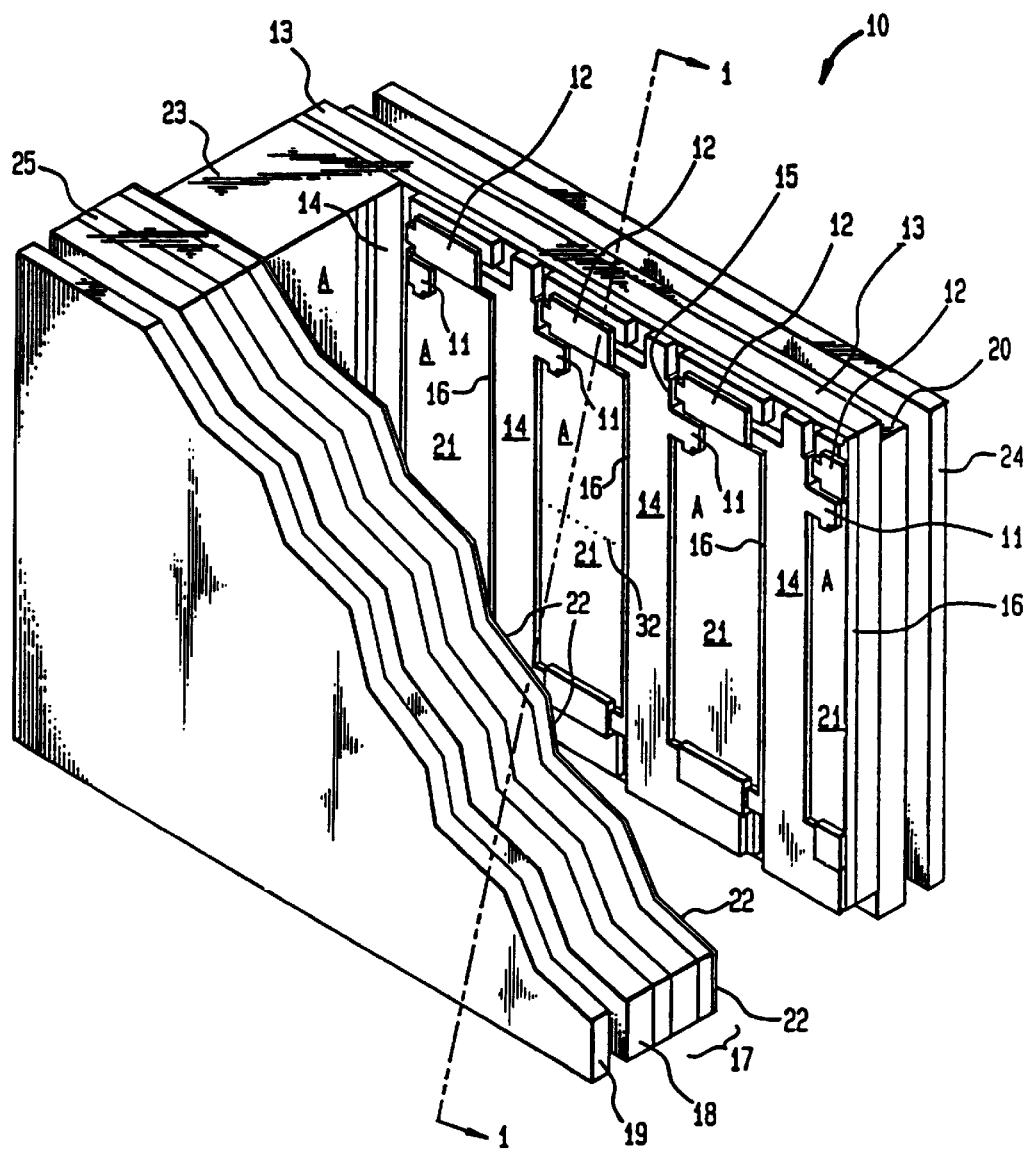
FIG. 1 is an enlarged partial perspective view of a TFT liquid crystal display which is exemplary of displays that can be enhanced by the present invention.

Although the present invention also is suitable for use in passive liquid crystal displays, it will be described in embodiments of an active display and specifically a thin film transistor (TFT) liquid crystal display. As partially shown in FIG. 1, a conventional TFT display 10 comprises an array of cells or pixels A, each cell including a thin film transistor 11 to address the cell by applying a voltage to the cell when the transistor is in its on state and a capacitor 12 which maintains the voltage after the transistor is switched off. The transistor is formed on a glass substrate 13 on the back side of the display 10 and is connected between a column or data electrode 14 and a row electrode 15 and to a display transparent electrode 16 of each pixel, all at the back side of the display 10. The front side of the display 10 is formed with a continuous common transparent electrode 17 which is spaced apart from and positioned parallel to the transparent display electrode. Both the common electrode 17 and the display electrode 16 are preferably formed of a thin transparent conductive material, such as indium tin oxide (ITO), carried on a glass substrate. Since the display electrode of each pixel is smaller in dimensions than the continuous common electrode, a fringe field results which spreads outward from the pixel or cell edges of the display electrode to the common electrode when voltage is applied across the electrodes. Parallel with the outside of the common electrode 17 and adjacent glass substrate 18 is a polarizer 19, which is appropriately orientated relative to a polarizer 20 mounted in back of the rear glass substrate 13. Alignment layers 21 and 22 are disposed on the inner surface of the display and common electrodes 16 and 17, respectively, and are in contact with a liquid crystal layer 23, herein twisted nematic liquid crystal molecules with a positive dielectric anisotropy, which is sealed between the two parallel mounted glass substrates carrying the alignment layers 21 and 22. On the back side of the display 10 is a visible light source (not shown) which irradiates the display 10 through a diffuser 24. If it is desired to have the display 10 in color, a color filter 25 is disposed adjacent the non-alignment layer side of the common electrode 17, and contains groups of the three primary colors (red, green, and blue), each one of the primary colors being associated with one of a group of three adjacent pixels A to form a color cell.

Figure 2:
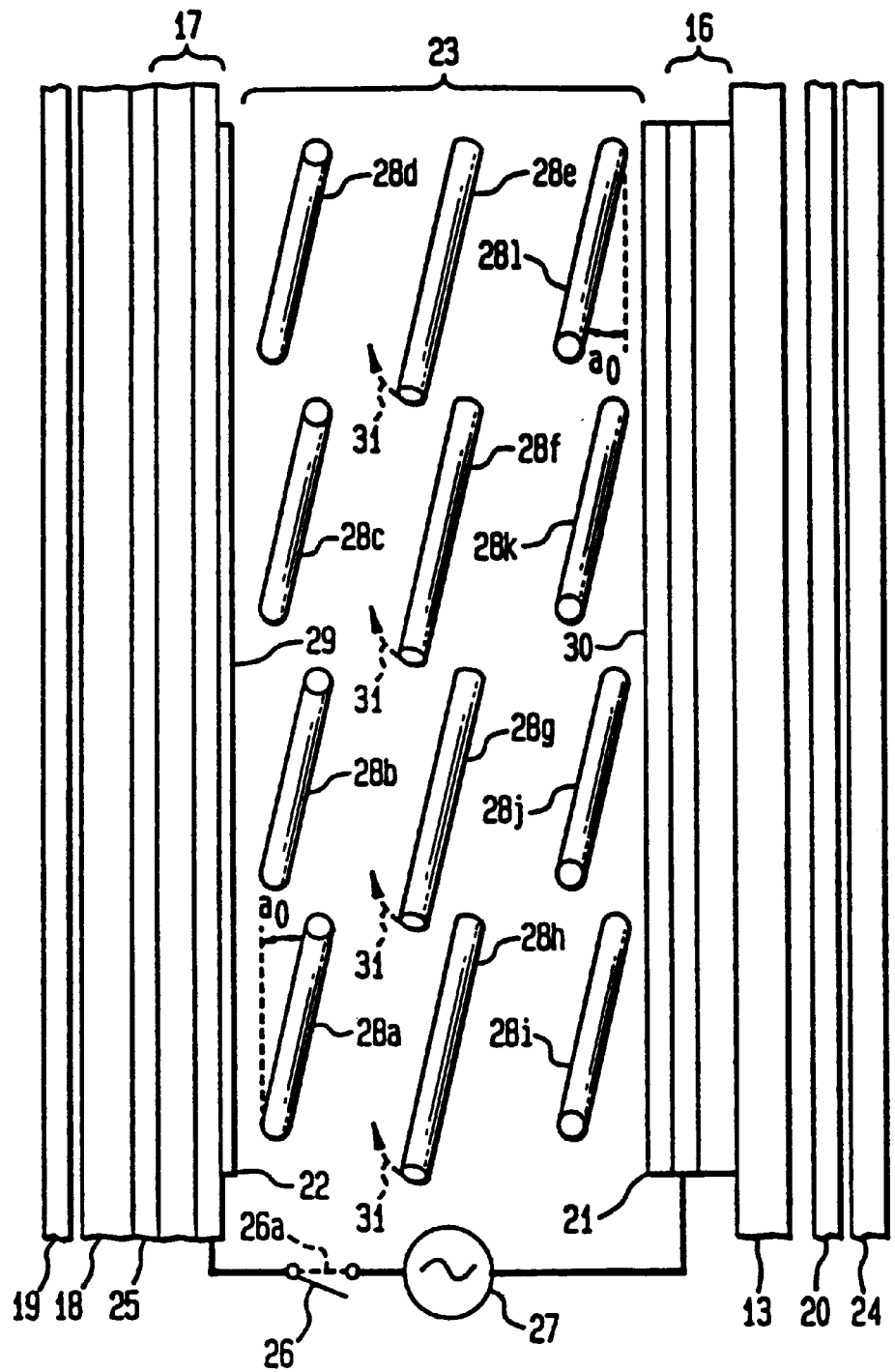
FIG. 2 is a cross-sectional view, taken along line 1—1 of FIG. 1 to partially show diagrammatically a single-domain cell or pixel of the display.

To illustrate the environment of the present invention in more detail, FIG. 2 shows an enlarged cross-section of the layers of a single domain cell or pixel (prior art) of the liquid crystal display taken along line 1—1 of FIG. 1 with switch 26 (representing the TFT in each pixel) open and a voltage is not applied across the liquid crystal layer 23. In this illustration, the liquid crystal layer comprises twisted nematic liquid crystals with a left-handed twist which is conventionally achieved by using chiral additives. FIG. 2 diagrammatically shows this LC layer 23 as elongated molecules 28a, 28b, 28c, 28d, 28e, 28f, 28g, 28h, 28i, 28j, 28k and 28l with molecules 28a, 28b, 28c and 28d being in contact with surface 29 of the front alignment layer 22 and molecules 28i, 28j, 28k and 28l being in contact with surface 30 of the rear or back alignment layer 21. Molecules 28a–d and molecules 28i–l are tilted longitudinally away from their respective surfaces 29, 30 by the same angle a0. Because of the twist angle of the LC molecules, the molecules along the surfaces 29 and 30 are drawn going into and out of the plane of the paper. The bulk molecules, as depicted by 28e–28h are drawn longer since they are oriented more parallel to the plane of the paper. Surface 29 of the front alignment layer 22 is disposed adjacent the transparent electrode 16, and the glass substrate 17, the color filter 25, which is optional, the glass substrate 18, and the polarizer 19 in that order. Surface 30 of the rear alignment layer 21 is disposed adjacent the transparent electrode 16, and the glass substrate 13, the polarizer 20 and the diffuser 24 in that order. The light on the back side of the diffuser 24 for irradiating the liquid crystal display panel is not shown. When switch 26 is closed as shown by the dashed line 26a and the voltage is applied, the molecules 28a–d and 28i–l on alignment surfaces 29 and 30 which are influenced by the same pre-tilt angle a0 cause the bulk molecules, as shown by the center molecules 28e–h, to move in the direction as shown by the dashed arrows 31 so that only a single domain exists in each pixel of the LC display, thereby limiting its viewing angle behavior.

Figure 3:
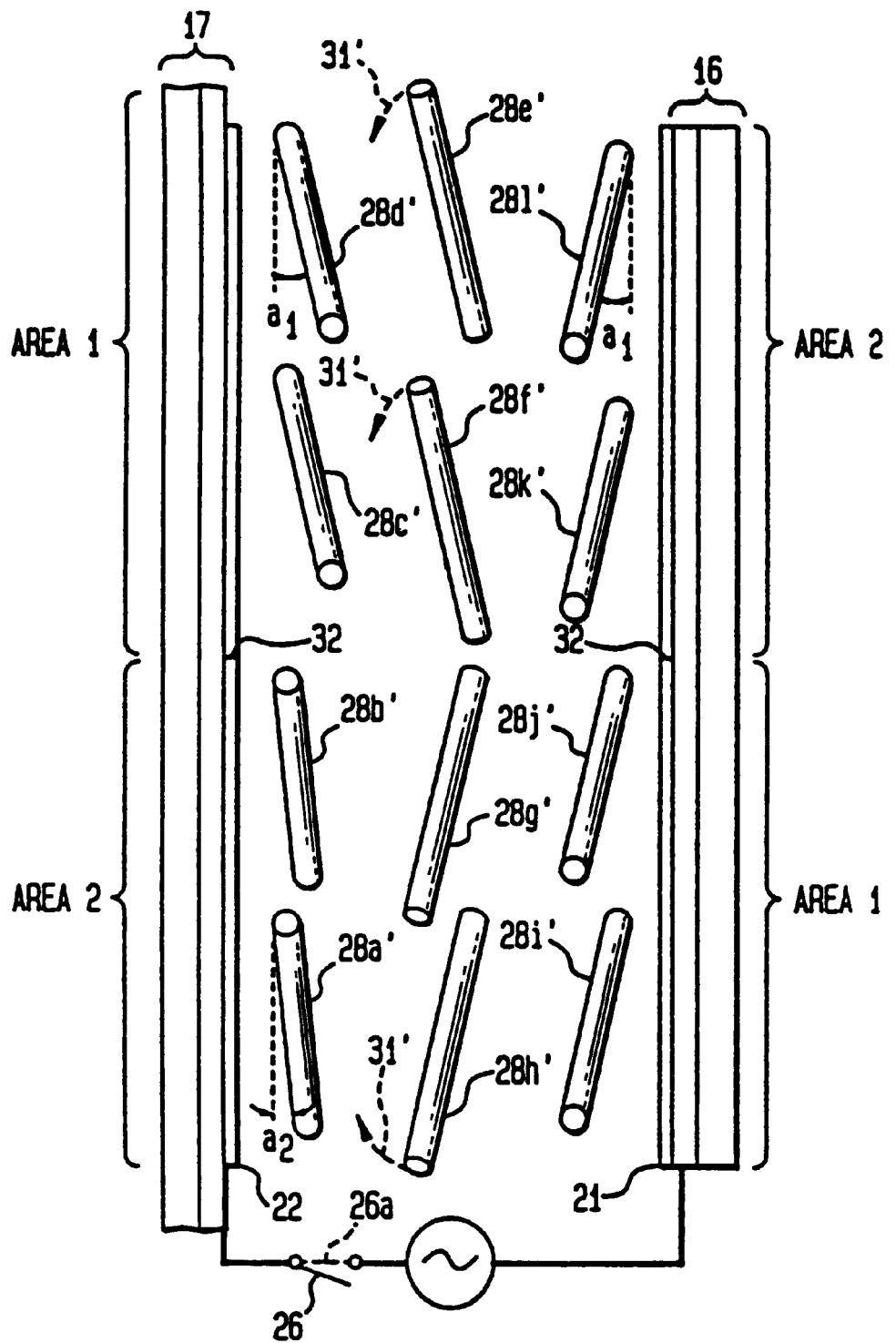
FIG. 3 is a partial cross-sectional view taken along line 1—1 of FIG. 1 diagrammatically showing an embodiment of the present invention.

To overcome this restricted viewing angle behavior, a first embodiment of the present invention is shown diagrammatically in FIG. 3 with only the liquid crystal molecules, the front 22 and read 21 alignment layers and the front 17 and rear 16 electrodes being displayed. In the embodiment, the composition of both alignment layers 21, 22 has regions with a different chemical composition in contact with the liquid crystal layer.

As shown in FIG. 3, in the mounted face-to-face position, the alignment layers 21, 22 of the cell or pixel is divided in half as indicated by the boundary line 32 (FIGS. 1 and 3) and Area I of the cell of the alignment layer 22 on the front glass electrode is across from the Area II of the cell of the alignment layer 21 on the back glass electrode. Of course then, Area II of the alignment layer 22 is across from Area I of the alignment layer 21. Since a D-type liquid crystal material was used in this embodiment, the pre-tilt angle a2 of the exposed Area II is smaller than the pre-tilt angle a1 of Area I. For these conditions of exposure, the pre-tilt angle a2 in exposed area II is preferably about 1 degree whereas the pretilt angle a1 in Area I is preferably about 4 degrees. FIG. 3 illustrates the present invention with the switch 26 open and without the voltage applied. In this no voltage state, molecules 28c', 28d', 28i' and 28j' in Area I all have a pretilt angle a1 greater than the pretilt angle a2 of the molecules 28a', 28b', 28k' and 28l' in Area II. When the switch is closed, as shown by dashed line 26'a, and voltage is applied, molecules 28c', 28d', 28i' and 28j' of Area I dominate the direction of movement of bulk molecules 28e', 28f', 28g' and 28h' as shown by the dashed arrows 31'. However, unlike the prior art single domain cell where all of the molecules are orientated in a common direction across the cell with the voltage applied, the molecules in each half of the cell or pixel of the present invention as shown in FIG. 3, are in a common orientation within each half of the cell in the direction of the fringe field at the edge of each of their respective halves, thereby creating the cells or pixels of the present invention with two domains.

According to the present invention, the differences in the pretilt angles is typically at,least about 1.5° and preferably at least about 3°.

Although the sequence of the exposure step and the alignment step, hereby by rubbing, is preferred, the sequence of these steps can be reversed. Also, the alignment method is not limited to rubbing and other known alignment methods as known by those skilled in the art could be used, such as ion etching.

The most preferred embodiment utilizes a photoimageable resin applied to the surface of a second material such that the pretilt angle after exposure and aligning such as rubbing differ by at least about 1.5° and preferably at least about 3°. The first material is most preferably a non-photosensitive polymer such as polyamide, polyamide precursor such as the polymeric acid, ester, or salt, or partially cured polyamide precursor, or a surface modified polyamide layer. This polymer can be applied by spincoating, screen printing, roll coating, vapor deposition, plasma deposition, etc. The layer of the first material is typically about 500 to about 2000 Å and more typically about 1000 to about 1500 Å.

The second layer is a photosensitive material such as photosensitive polyimides, photosensitive polyamide precursors such as salts, esters, or acids, acrylates, methacrylates, epoxies, urethanes, styrenes, epoxyacrylates and the like. The above can be monofunctional, bifunctional, multifunctional monomers, oligomers or polymers.

An example of the first embodiment involves spinning on a substrate the Nissan polyamide 1024 and curing this polymer at about 180° or about 1 hour. On top of this polymer is applied a solution of an acrylate or methacrylate monomer, with an appropriate initiator. Examples of acrylate/methacrylate monomers include hydroxyethylmethacrylate, including polyethylenically unsaturated compounds that are capable of reacting upon exposure to actinic radiation such as ultraviolet light, and usually those that contain terminal ethylenic groups. Such compounds include unsaturated esters of polyols and especially esters of the methylene carboxylic acid such as ethylene diacrylate, diethylene glycol diacrylate, glycerol diacrylate, glycerol triacrylate, ethylene dimethacrylate, 1,3-propylene dimethacrylate, 1,2,4-butene triol trimethacrylate, 1,4-benzenediol dimethacrylate, pentaerythritol tetramethacrylate, 1,3-propane diol diacrylate, 1,6-hexane diol diacrylate, the bis-acrylates and methacrylates of polyethylene glycols of molecular weight 200–500, trimethylol propane triacrylate, 2-ethyl-2-(hydroxylmethyl)-1,3 propanediol triacrylate, pentaerythritol triarcrylate, unsaturated amides such as those of the methylene carboxylic acids and especially those of alpha, omega-diamines and oxygen-interrupted omegadiamines such as methylene bisacryl and bismethacrylamide, diethylene triamine tris-methacrylamide, bis-(methacrylamidopropoxy) ethane, bis-methacrylamidoethyl methacrylate, N-[(B-hydroxyethyloxy) ethyl] acrylamide, vinyl-esters such as divinyl succinate, divinyl adipate, divinyl phthalate, divinyl terephthalate, divinyl benzene-1,3-disulfonate, and divinyl butane-1,4-disulfonate, and unsaturated aldehydes such as sorbaldehyde.

The composition will typically contain about 1% to about 10% and preferably about 2% to about 8% by weight of the copolyamic acid or derivative thereof.

Examples of initiators include Irgacure 907, Irgacure 651 and CG 25-369.

The ethanolamine derivatives include, for example N-phenyldiethanolamine, N-phenylethanolamine, and N-phenyl-N'-ethylethanolamine. The mercapto containing aromatic heterocyclic compounds include, for example, 2-mercaptobenzimdazol, 2-mercaptobenzothiazole, and 1-phenyl-5-mercapto-1H-tetrazole.

The film thickness of the photosensitive layer is typically about 10 to about 1000 Å. The film is selectively exposed to actinic light such as UV light. In the most preferred case, the photoinitiator and photoresin do not absorb in the visible region of the electromagnetic spectrum as any absorption in this region would reduce the efficiency of the LCD device.

Following exposure to the light source, selective polymerization of the second polymer is initiated to form higher molecular weight material with different physical properties (including pretilt angle) compared with the unexposed region. This structure can then be heated to complete the polymerization of the exposed regions of the second polymer. This enables the removal of the unexposed region by washing in an aqueous medium or solvent, evaporation (by applying gentle heating or applying a vacuum) to leave a thin coating of the second polymer in specific locations, as defined by the mask used during the exposure. This structure can then be heated to a suitable temperature to substantially complete the reaction of the second polymer, if necessary.

Because of the polar hydroxy groups for example of the photo resins, it is expected that good adhesion of the first layer to the polyamide layer is attained. The adhesion can be further enhanced, if need by, by plasma or surface treatment of the first polymer layer to modify the surface prior to applying the second layer.

The above two-layer, exposed structure is then aligned such as being rubbed and the structure completed according to standard processing conditions.

In a second embodiment, the polymerization of the second layer is accomplished by forming reactive sites on the first polymer in specific locations prior to application of the second polymer. Following heat treatment, the reactive sites on the first polymer initiate reaction of the second polymer to form a surface in which there are two different materials. The unreacted second polymer is then removed by solvent or aqueous washing, evaporation, etc. The advantage of this approach is that no photoinitiator is required in the surface layer. The surface modification of the first polymer surface can be accomplished utilizing a variety of techniques, including exposure with actinic light such as UV light, deep UV, vacuum UV light of a very short wavelength, x-ray radiation or electron beam irradiation which will be absorbed in the very top layers of the first polymer.

The first polymer is preferably a photosensitive polymer such as a polyamide, in which the absorption of the radiation will cause changes in the chemical structure to form crosslinks or chain scission and free radicals. The chemical changes at reasonable doses of radiation are not usually sufficient to cause a significant change in the pretilt properties of these materials, but the free radicals are sufficient to initiate reaction of a reactive monomer, such as hydroxyethylmethacrylate and the other types discussed hereinabove in referring to the first embodiment. The first polymer need not be photosensitive and need only be capable of generating free radical reactive sites upon exposure.

An example of this approach is first applying the polyamide CG412, Ultradell for AMOCO or Nissan 1024. The second layer can be an acrylate, methacrylate, urethane, epoxy, styrene and epoxyacrylate including those disclosed hereinabove in referring to the first embodiment. The above can be mono or multifunctional monomers, oligomers, or prepolymers with pendant crosslinkable groups. The second layer has groups that are reactive with the reactive sites created in the underlying first polymer layer.

The photosystems described above are "negative acting" in photoresist language, in that the region exposed to the radiation becomes less soluble and thus remains. Non-exposed regions in these systems are more soluble and thus can be removed by appropriate solvents. In the case of the present invention, photosensitive material remains in place in the final LCD panel. The exposure is used to change the chemical and physical properties of the material and in turn control the pretilt angle.

In addition to systems in which the surface layer is so-called "negative" acting, "positive" acting systems can also be employed. In these systems, the regions exposed to the radiation source undergo chain scission or other chemical reactions which render the material more soluble as compared to the unexposed regions. These exposed regions can then be selectively removed by dissolving in a suitable solvent. Suitable "positive acting" systems include phenolic formaldehyde novolaks and related derivatives such as meta cresol. Poly(t-butyl oxycarbonyl oxystyrene) is another example. In this embodiment utilizing a "positive resist technique, the structure can be rubbed after exposure and removal of the unwanted regions of the second polymer coating in a manner similar to that for the "negative" case above.

The foregoing description of the invention illustrates and describes the present invention. Additionally, the disclosure shows and describes only the preferred embodiments of the invention but, as mentioned above, it is to be understood that the invention is capable of use in various other combinations, modifications, and environments and is capable of changes or modifications within the scope of the inventive concept as expressed herein, commensurate with the above teachings and/or the skill or knowledge of the relevant art. The embodiments described hereinabove are further intended to explain best modes known of practicing the invention and to enable others skilled in the art to utilize the invention in such, or other, embodiments and with the various modifications required by the particular applications or uses of the invention. Accordingly, the description is not intended to limit the invention to the form disclosed herein. Also, it is intended that the appended claims be construed to include alternative embodiments.

What is claimed is:

1. A liquid crystal display panel comprising a plurality of pixels wherein each pixel has an alignment layer having at least two regions provided with an organic polymer alignment layer with pretilt angles differing from each other by at least about 1.5° when aligned in the same direction for enhancing the viewing angle of the liquid crystal displays;

wherein one of the regions of said pixel is from a non-photosensitive polymer and another of the regions of said pixel is from an exposed photosensitive material; and wherein said exposed photosensitive material is located beneath said non-photosensitive polymer.

2. The liquid crystal display panel of claim 1 wherein said pretilt angles differ from each other by at least about 3°.

3. The liquid crystal display panel of claim 1 wherein said exposed photosensitive material has a thickness of about 10 Å to about 1000 Å and said non-photosensitive polymer has a thickness of about 500 Å to about 2000 Å.

4. The liquid crystal display of claim 1 wherein said non-photosensitive polymer is a polyamide or polyamide precursor and said photosensitive material is selected from the group consisting of acrylates, methacrylates, epoxies, urethanes, styrenes and epoxy acrylates.

5. The liquid crystal display of claim 1 wherein said photosensitive material is negative acting.

6. A method for fabricating a pixel for a liquid crystal display which comprises providing a first alignment layer of a first organic polymeric material, providing a second alignment layer of a second organic polymeric material different from said first organic polymeric material on selected regions less than the entire pixel; wherein said first and second alignment layers have pretilt angles differing from each other by at least about 1.5° when rubbed in the same direction;

aligning said first and second alignment layers in the same direction thereby forming an alignment with at least two areas with pretilt angles differing from each other by at least about 1.5° for enhancing the viewing angle of the liquid crystal display; and wherein said first organic polymeric material is a non-photosensitive polymer and wherein said second organic polymeric material is provided by applying a layer of a photosensitive material on top of said first alignment layer, selectively exposing to actinic light said photosensitive material and then developing said photosensitive layer;

and which further comprises rubbing said first and second layers prior to said exposing to actinic light.

7. The method of claim 6 wherein said pretilt angles differ from each other by at least about 3°.

8. The method of claim 6 wherein said photosensitive material is a negative photosensitive material.

9. The method of claim 6 wherein said photosensitive material is a positive photosensitive material.

10. The method of claim 6 wherein the exposed photosensitive material has a thickness of about 10 Å to about 1000 Å and said non-photosensitive polymer has a thickness of about 500 Å to about 2000 Å.

11. The method of claim 6 wherein said first organic polymeric material is provided by applying a first layer of a photosensitive material, selectively exposing said photosensitive material to actinic light to create reactive sites where exposed; applying a layer of a second organic material having crosslinkable sites to said first layer and causing reaction between said reactive sites and said crosslinkable sites; and removing the unreacted portions of said second organic material.

12. The method of claim 6 wherein said non-photosensitive polymer is a polyamide or polyamide precursor and said photosensitive material is selected from the group consisting of acrylates, methacrylates, epoxies, urethanes, styrenes and epoxyacrylates.

13. A liquid crystal display panel comprising a plurality of pixels wherein each pixel has an alignment layer having at least two regions provided with an organic polymer alignment layer with pretilt angles differing from each other by at least about 1.5° when aligned in the same direction for enhancing the viewing angle of the liquid crystal display;

wherein one of the regions of said pixel is from a non-photosensitive polymer and another of the regions of said pixel is from an exposed photosensitive material; and wherein said exposed photosensitive material is located above said non-photosensitive polymer; and further wherein said exposed photosensitive material has a thickness of about 10 Å to about 1000 Å and said non-photosensitive polymer has a thickness of about 500 Å to about 2000 Å.

14. The liquid crystal display panel of claim 13 wherein said pretilt angles differ from each other by at least about 3°.

15. The liquid crystal display of claim 13 wherein said non-photosensitive polymer is a polyamide or polyamide precursor and said photosensitive material is selected from the group consisting of acrylates, methacrylates, epoxies, urethanes, styrenes and epoxy acrylates.

16. The liquid crystal display of claim 13 wherein photosensitive material is negative acting.

17. A method for fabricating a pixel for a liquid crystal display which comprises providing a first alignment layer of a first organic polymeric material, providing a second alignment layer of a second organic polymeric material different from said first organic polymeric material on selected regions less than the entire pixel; wherein said first and second alignment layers have pretilt angles differing from each other by at least about 1.5° when rubbed in the same direction;

aligning said first and second alignment layers in the same direction thereby forming an alignment with at least two areas with pretilt angles differing from each other by at least about 1.5° for enhancing the viewing angle of the liquid crystal display; and wherein said first organic polymeric material is a non-photosensitive polymer and wherein said second organic polymeric material is provided by applying a layer of a photosensitive material on top of said first alignment layer, selectively exposing to actinic light said photosensitive material and then developing said photosensitive layer; and wherein the exposed photosensitive material has a thickness of about 10 Å to about 1000 Å and said non-photosensitive polymer has a thickness of about 500 Å to about 2000 Å.

18. The method of claim 17 wherein said pretilt angles differ from each other by at least about 3°.

19. The method of claim 17 wherein said aligning is rubbing.

20. The method of claim 17 which comprises rubbing said first and second layers after said exposing to actinic light.

21. The method of claim 17 wherein said photosensitive material is a negative photosensitive material.

22. The method of claim 17 wherein said photosensitive material is a positive photosensitive material.

23. The method of claim 17 wherein said non-photosensitive polymer is a polyamide or polyamide precursor and said photosensitive material is selected from the group consisting of acrylates, methacrylates, epoxies, urethanes, styrenes and epoxyacrylates.

24. A method for fabricating a pixel for a liquid crystal display which comprises providing a first alignment layer of a first organic polymeric material, providing a second alignment layer of a second organic polymeric material different from said first organic polymeric material on selected regions less than the entire pixel; wherein said first and second alignment layers have pretilt angles differing from each other by at least about 1.5° when rubbed in the same direction;

aligning said first and second alignment layers in the same direction thereby forming an alignment with at least two areas with pretilt angles differing from each other by at least about 1.5° for enhancing the viewing angle of the liquid crystal display; and wherein said first organic polymeric material is provided by applying a first layer of a photosensitive material, selectively exposing said photosensitive material to actinic light to create reactive sites where exposed; applying a layer of a second organic material having crosslinkable sites to said first layer and causing reaction between said reactive sites and said crosslinkable sites; and removing the unreacted portions of said second organic material.

25. The method of claim 24 wherein said pretilt angles differ from each other by at least about 3°.

26. The method of claim 24 wherein said aligning is rubbing.

27. The method of claim 24 which comprises rubbing said first and second layers after said exposing to actinic light.

28. The method of claim 24 which comprises rubbing said first and second layers prior to said exposing to actinic light.

29. The method of claim 24 wherein said photosensitive material is a negative photosensitive material.

30. The method of claim 24 wherein said photosensitive material is a positive photosensitive material.

31. The method of claim 24 wherein the exposed photosensitive material has a thickness of about 10 Å to about 1000 Å and said non-photosensitive polymer has a thickness of about 500 Å to about 2000 Å.

32. The method of claim 24 wherein said non-photosensitive polymer is a polyamide or polyamide precursor and said photosensitive material is selected from the group consisting of acrylates, methacrylates, epoxies, urethanes, styrenes and epoxyacrylates.

* * * * *